UNITED STATES PATENT OFFICE.

HERMANN PLAUSON, OF HAMBURG, GERMANY.

PROCESS OF IMPROVING THE ODOR, TASTE, AND DIGESTIBILITY OF RAW YEAST FOR THE PURPOSE OF EMPLOYING IT AS EDIBLE YEAST.

1,415,469.  Specification of Letters Patent.  Patented May 9, 1922.

No Drawing.  Application filed January 13, 1921. Serial No. 437,120.

*To all whom it may concern:*

Be it known that I, HERMANN PLAUSON, Esthonian subject, residing in Hamburg, Germany, have invented certain new and useful Process for Improving the Odor, Taste, and Digestibility of Raw Yeast for the Purpose of Employing It as Edible Yeast, (for which I have filed an application in Germany on March 16, 1919,) of which the following is a specification.

This invention relates to a process for making a highly valuable, odorless and agreeable flavoured edible yeast from ordinary brewers' and the like yeast.

It has been found that finely divided brewers' yeast, after the bitter taste has been removed by treatment with alkalies and the like, and after having been washed, is changed by the action of hydrogen at a sufficiently high pressure and by the addition of heat, so that it becomes almost odorless. This treatment also imparts to it an agreeable, spicy or aromatic taste and its use excites no dizziness or vomiting as is usually the case with other edible yeasts.

The reaction proceeds much more smoothly and intensively if the yeast cells are first ruptured.

It is known to peptonize certain proteins in the presence of salts and hydrogen under increased pressure at high temperatures to convert them into a soluble, non-coagulating form.

In the process according to this invention however the final object is not the decomposition of the yeast, i. e. the peptonizing of the proteins contained in it is not the final object but the removal of the disagreeable flavour. It could not have been anticipated that the latter could be removed so simply without the addition of acids or salts merely by the action of hydrogen at an increased pressure and temperature.

A certain improvement of the flavour of the yeast has also been obtained by treatment with dilute tartaric acid solution at 45–50° but the reason of this is only the partial removal of the potash compounds by their precipitation as bitartrate which is with difficulty soluble.

By this improved process the unpleasant tasting organic compounds in particular are chemically changed and converted into hydrogenated, tasteless and odorless substances. Exact details of the chemistry of the process cannot yet be given, but it is certain that hydrogen under pressure at high temperatures, even without the use of catalyzers, acts on the yeast and, what could not be anticipated improves both its taste and odor and also its digestibility.

The process will be further explained by the following examples:—

*Example 1.*

100 parts washed fresh yeast (wet yeast) are treated in a pressing apparatus fitted with stirring gear in known manner with weak ammonium or sodium carbonate solution or with ammonia water or with a solution of sodium bi-borate or borax until it becomes clear and then washed with warm water at 30–40° until all hop bitters and the last traces of borax or soda are removed.

To 100 parts of yeast freed from bitter flavour in this way—100 to 600 parts of water are then added whereupon the mass is treated for from 15 to 60 minutes in a high speed disintegrator or colloid mill. All the yeast cells are thereby ruptured and so finely divided in the liquid that it may be described as yeast milk in which the yeast is distributed in the stable colloidal form like the casein in milk. The term "yeast milk" is employed to denote such a stable colloidal dispersion. The yeast milk may also be used in this liquid form, particularly if suitable oils or fats be added thereto.

If this milk be subjected in a pressure vat after the oxygen has been completely removed by blowing a neutral gas through to the action of hydrogen at 100 to 200 atmospheres and a temperature of 100 to 130° C. for from 1 to 5 hours there is obtained after the mass has cooled and been thoroughly dried on a drying drum preferably with the use of vacuum and afterwards grinding, an albuminous preparation which has a weak, agreeable odour and is almost tasteless. The preparation can be flavoured in various ways by being mixed with suitable flavouring substances (cocoa, sugar and the like). If only evaporated to the consistency of syrup and not to a dry state, the product can be sold as a nutritive extract.

*Example 2.*

100 parts of fresh yeast (top yeast or barm) which has been freed from its bitter flavour is disintegrated at high speed directly with 100 parts of water until the yeast cells are thoroughly ruptured, and then heated to 100–110° at 100 atmospheres hydrogen pressure for 3 hours in pressure resisting vessels. When cool, the resultant mass is dialyzed in an osmose apparatus (preferably by electro-osmosis) for the purpose of removing all salts. An extremely nutritive yeast product is thus obtained, which like the one mentioned in example 1 may be obtained in a pulverulent form or in a syrupy consistency as human nutriment.

With some kinds of yeast (for instance yeast produced by bottom or sedimentary fermentation) after the treatment with hydrogen, a further washing has been found necessary before drying; this washing is preferably done with warm water in a squeezing apparatus provided with stirrers.

The addition of small quantities (0.1–3%) of chloride of sodium, organic acids, for instance formic acid, acetic,—tartaric—or citric acids facilitates the action, and on the other hand alkalies interfere with the reaction. Hydrogen may also be caused to act on dry, yeast powder which has been freed from bitter flavour, (the commercially known edible yeast) only then the mass of yeast must be spread loosely on spaced baffles or shelves in autoclaves. The conditions of pressure and temperature are the same as in the treatment of raw yeast. The presence of the ordinary catalysts for instance nickel, palladium and the like accelerates the reaction, they must however be employed in large pieces and not in the form of powder, as they are otherwise too difficult to remove. Nickel-plated pressure vessels may for instance be here employed. On an increase of temperature to 130–150° C. and with longer action (24–48 hours) the hydrogen pressure may be considerably diminished (to 20–30 atmospheres) but a further (washing) purification will be necessary after the hydrogen treatment, as the yeast at this temperature commences to decompose.

Of course the alteration and improvement of the flavour by the action of hydrogen may be obtained without the previous disintegration of the yeast cells, but experiments have shown that when the cells are disintegrated the digestibility is increased by 10–15%.

In order to improve the action of the hydrogen the contents of the autoclaves may be mixed by stirring or the like. (Use of an autoclave provided with stirring apparatus.)

I declare that what I claim is:—

1. The process of treating yeast which comprises heating it with hydrogen under high pressure.

2. The process of treating yeast to improve its flavour which consists in hydrogenating it.

3. The process of treating yeast which comprises heating it with hydrogen under high pressure of the order of 100 atmospheres.

4. The process of treating yeast which consists in rupturing the cells by disintegration in water at high speed and then hydrogenating the yeast.

5. The process of treating yeast which comprises heating it with hydrogen under high pressure while suspended in water.

6. The process of making yeast milk, which comprises subjecting yeast to intensive mechanical disintegration in presence of water to yield a colloidal solution.

7. Hydrogenated yeast.

8. A preliminary product in the manufacture of hydrogenated yeast in which the yeast cells are ruptured and the cell content in conjunction with the walls form a colloidal solution.

9. A hydrogenated yeast milk in which the yeast cells are mechanically disintegrated and form a colloidal solution.

In witness whereof, I have hereunto signed my name this 30 day of Dec. 1920, in the presence of two subscribing witnesses.

HERMANN PLAUSON.

Witnesses:
 HECTOR ARMSTRONG,
 W. H. BURTON.